United States Patent
Mon et al.

(10) Patent No.: US 6,430,506 B1
(45) Date of Patent: Aug. 6, 2002

(54) FUZZY LOGIC BASED VEHICLE COLLISION AVOIDANCE WARNING DEVICE

(75) Inventors: Yi-Jen Mon; Ren-Her Chen, both of Taoyuan Hsien; Kuang-Tso Luo, Taipei, all of (TW)

(73) Assignee: Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 10/034,031

(22) Filed: Dec. 19, 2001

(51) Int. Cl.[7] ................................................ G05B 13/00

(52) U.S. Cl. ......................................... 701/301; 701/98

(58) Field of Search ............................... 701/93, 96, 98, 701/300, 301, 27; 340/436; 342/455

(56) References Cited

U.S. PATENT DOCUMENTS

| | | | | |
|---|---|---|---|---|
| 5,983,161 A | * | 11/1999 | Lemelson et al. | 701/301 |
| 5,995,737 A | * | 11/1999 | Bonissone et al. | 701/98 |
| 6,240,357 B1 | * | 5/2001 | Bastian | 701/98 |
| 6,275,773 B1 | * | 8/2001 | Lemelson et al. | 701/301 |

* cited by examiner

Primary Examiner—Richard M. Camby
(74) Attorney, Agent, or Firm—J.C. Patents

(57) ABSTRACT

A vehicle collision avoidance warning device comprising a sensing module for detecting engine RPM, fuel throttle depress level, vehicle speed, and relative distance; a fuzzy logic controller coupled to the sensing module for receiving the engine RPM, throttle index, vehicle speed, and relative distance and generating a safety distance value using fuzzy logic; a safety warning device coupled to the fuzzy logic controller and the sensing module for comparing the distance with the safety distance and outputting a warning signal according to the comparison result.

6 Claims, 8 Drawing Sheets

FUZZY LOGIC BASED VEHICLE COLLISION AVOIDANCE WARNING DEVICE

BACKGROUND OF THE INVENTION

1. Field of the Invention

This invention relates to a collision avoidance warning device, more particularly to a vehicle collision avoidance system implementing a fuzzy logic based vehicle collision avoidance warning device.

2. Description of Related Art

In the modern society, owing a vehicle is not a difficult task because the retail price of vehicles is going down and consumer's spending power is going up. As a result, the number of vehicles on the road rapidly increases. Since more vehicles on the road, more accidents are bound to happen. In the past, the driver judges the distance between his/her vehicle and the vehicle in front by human vision and accordingly brakes or performs some recovery maneuvers for preventing danger caused by vehicle collision. However vehicle collisions continue to happen because human cannot accurately determine distance or human sometimes make careless mistakes. Therefore, the method of monitoring the driver cannot effectively avoid danger. Recently, the development of vehicle warning system is to compensate for human inability.

There are already solutions to the above problem such as U.S. Pat. No. 5,699,040, which suggests a vehicle collision preventing system. This system determines the possibility of collision according to the distance between the travelling vehicle and the target vehicle (including lateral and longitudinal distances). A 'K' value is obtained by measuring the lateral relative distance and the friction coefficient to determine the safety braking distance.

Based on the above method, the lateral relative distance cannot be accurately obtained. Moreover, the road friction coefficient must be obtained from a sensing device located in the tire, which adds to manufacturing cost of the system. If the appropriate coefficient is deviated, the safety braking distance will be affected.

Furthermore, U.S. Pat. No. 5,521,580 suggests a danger avoidance system for a vehicle, which tests the driver's awareness to danger and when the driver is not aware of danger, the system will activate the danger avoidance system. The system comprises an ambient condition monitoring system, a vehicle monitoring system, and a driver monitoring system to activate travelling condition deciding and danger recognition confirming.

Based on the above method, if the driver monitoring system fails, travelling condition deciding and danger recognition confirming cannot be activated. The driver monitoring system consisting of 15 sensing devices to measure temperature, blood pressure etc . . . is expensive and causes inconvenience to the driver. Assume if the driver is carelessly lazy, the driver monitoring system might mistakenly judges the condition of that the driver has been aware of danger such that the danger recognition confirming cannot be activated.

Furthermore, Republic of China Patent Number 134625 suggests a method of using formulas to calculate the distance between the travelling vehicle and the vehicles in front and behind. The disadvantage of this system is the requirement of precise measurement of distance between the vehicles and it does not take into account the ambient and driver conditions. Moreover, this method is formula based, which cannot posses good robustness and disturbance rejection ability.

SUMMARY OF THE INVENTION

An object of this invention is a vehicle collision avoidance warning device, more particularly a fuzzy logic based vehicle collision avoidance warning device, which can reduce the number of sensing devices and also correct errors from the sensing devices.

Another object of this invention is a vehicle collision avoidance warning device, more particularly a fuzzy logic based vehicle collision avoidance warning device, which avoids using a complicated driver monitoring system.

Another object of this invention is a vehicle collision avoidance warning device, more particularly a fuzzy logic based vehicle collision avoidance system, which does not require a precise distance measurement and has high flexibility and ability to withstand interference.

In order to achieve the above objects, this invention provides a vehicle collision avoidance system, which comprises a sensing module that detects parameters of engine RPM (Rotation per minute), throttle opening, vehicle speed, and relative distance; a fuzzy logic controller coupled to the sensing module to receive the parameters of engine RPM, fuel throttle index, vehicle speed, and relative distance and generate a safety distance value using fuzzy logic; a safety warning indicator coupled to the fuzzy logic controller and sensing module to compare the relative distance with the safety distance value and generate a warning signal based on the comparison result.

The above sensing module further comprises an engine RPM sensing device for detecting the engine RPM of the vehicle, a fuel throttle sensing device for detecting the throttle input of the driver and output a throttle index, a vehicle speed sensing device for detecting the speed of the vehicle, and a distance sensing device for measuring relative distance.

The above fuzzy logic controller further comprises a differentiator that receives the relative distance signal and differentiate it to get a distance variation over time; an adjusting factor fuzzy logic inference module that receives the parameters of engine RPM, fuel throttle index, and vehicle speed to deduce an adjusting factor using fuzzy logic; a safety distance fuzzy logic inference module coupled to the differentiator to receive vehicle speed parameter and the output of the differentiator to deduce a safety distance using fuzzy logic; and a multiplier coupled to the adjusting factor fuzzy logic inference module and the safety distance fuzzy logic inference module to multiply the adjusting factor by the deduced safety distance to generate a safety distance value.

This invention provides a vehicle collision avoidance warning method. Firstly, the parameters of the vehicle such as engine RPM, fuel throttle index, vehicle speed, and relative distance are received. Following is to deduce a safety distance using fuzzy logic according to the obtained parameters of engine RPM, fuel throttle index, vehicle speed, and relative distance. A comparison of the safety distance value with the relative distance will generate a warning signal.

Furthermore, the fuzzy logic controller generates an adjusting factor according to the parameters of engine RPM, fuel throttle index, and vehicle speed. A deduced safety distance is obtained using fuzzy logic according to the vehicle speed and the distance variation during the time interval. The deduced safety distance is multiplied by the adjusting factor to generate a safety distance. When the relative distance is smaller than the safety distance, the warning signal is a danger signal. Otherwise, determine if the relative distance is greater than a predefined value. If the relative distance is greater than the predefined value, the warning signal is a safe signal, and if the relative distance is smaller than the predefined value, the warning signal is a caution warning.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

Figure 1:
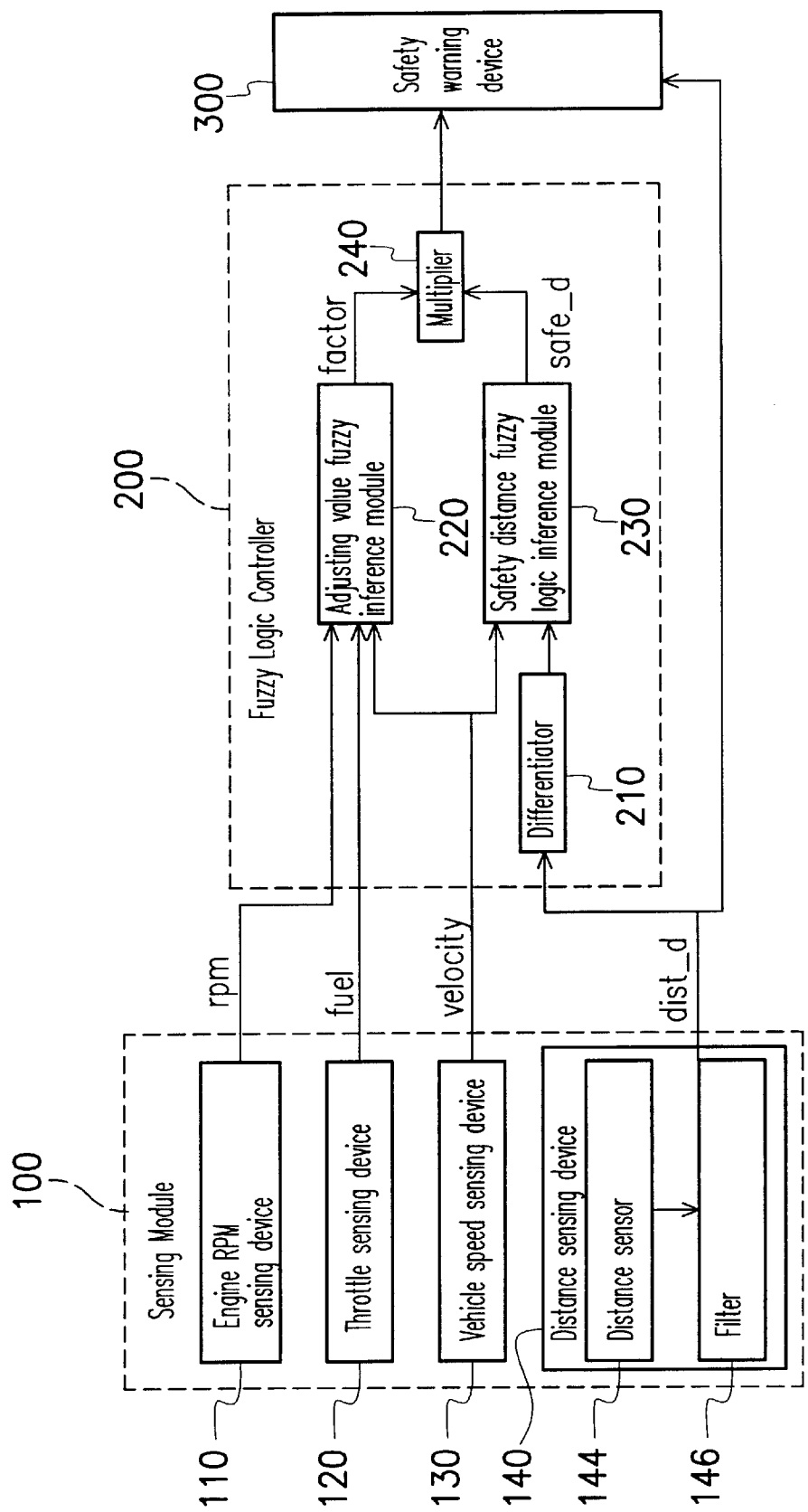
FIG. 1 is a block diagram of the vehicle collision avoidance warning device of a preferred embodiment of this invention.
Figure 2A:
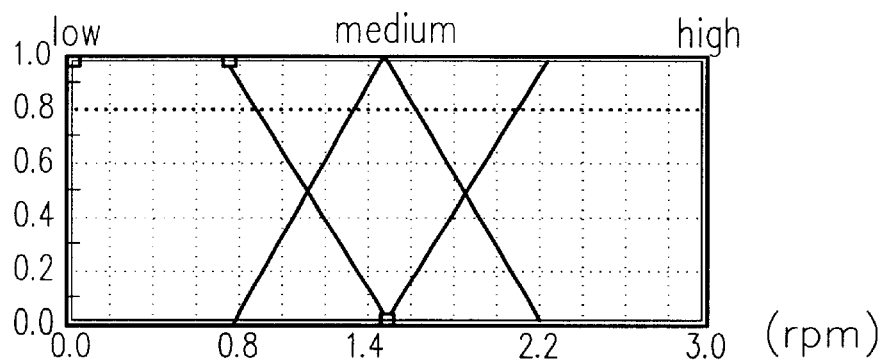
FIG. 2A is a graph showing the input membership function of the engine RPM in the adjusting factor fuzzy logic inference module.
Figure 2B:
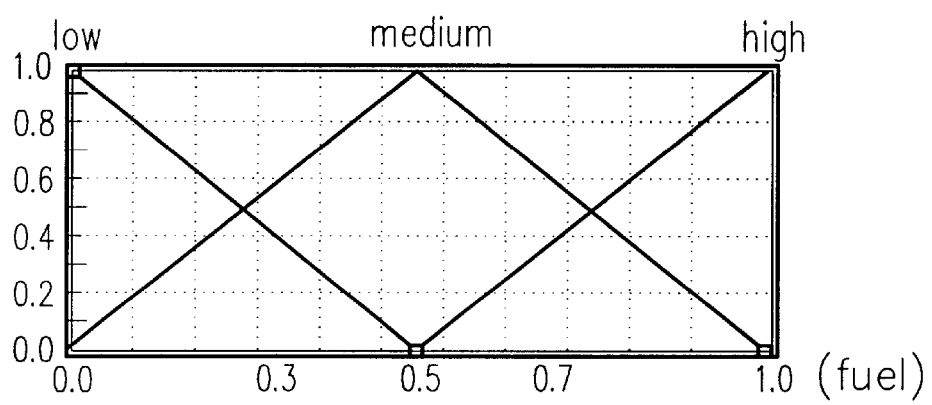
FIG. 2B is a graph showing the input membership function of the fuel throttle in the adjusting factor fuzzy logic inference module.
Figure 2C:
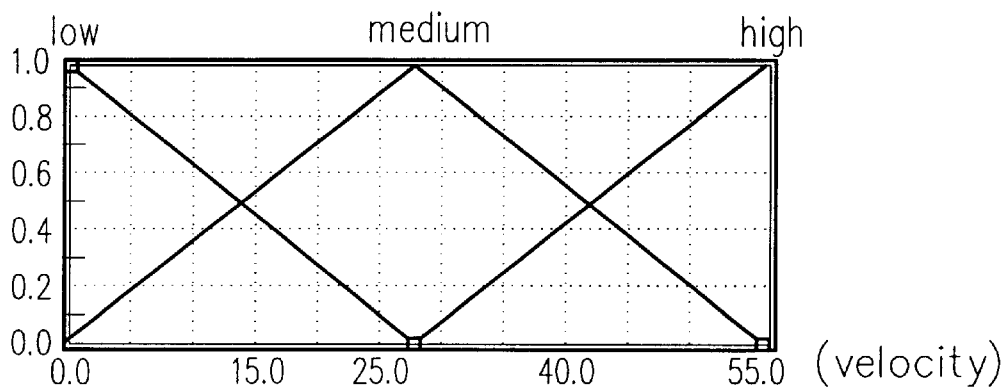
FIG. 2C is a graph showing the input membership function of the vehicle velocity in the adjusting factor fuzzy logic inference module.
Figure 2D:
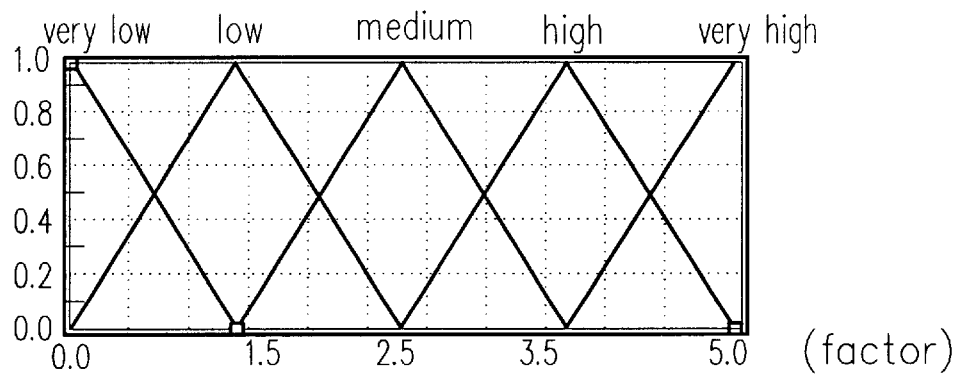
FIG. 2D is a graph showing the output membership function of the adjusting factor in the adjusting factor fuzzy logic inference module.

In FIG. 1, the fuzzy logic based vehicle collision avoidance warning device comprises three main components: a sensing module 1, a fuzzy logic controller 200, and a safety warning indicator 300. Sensing module 100 is used to detect the different parameters of the vehicle such as engine RPM, vehicle speed, throttle depress level, the distance from the target vehicle, and the like. Fuzzy logic controller 200 is coupled to sensing module 100 for receiving the parameters of engine RPM, vehicle speed, throttle depress level, and the distance from the target vehicle and accordingly deduce a safety distance. Safety warning indicator 300 is coupled to fuzzy logic controller 200 and sensing module 100 to receive the deduced safety distance from the output of fuzzy logic controller 200 and the relative distance from the target vehicle from sensing module 100. Safety warning indicator 300 will compare the results and determine if it is safe, danger, or caution.

Sensing module 100 is used for detecting the parameters of the vehicle comprising the sensing devices that are already in the vehicle such as an engine RPM sensing device 110, a fuel throttle sensing device 120, a vehicle speed sensing device 130, a relative distance sensing device 140, and a filter 150. Engine RPM sensing device 110 receives engine RPM in units of 1000 rpm/min. Throttle sensing device 120 receives the depress level of throttle by the driver in values between 0 to 1. Vehicle speed sensing device 130 detects the speed of the vehicle and converts it into units of m/sec. Distance sensing device 140 including a distance sensor 144 for measuring the distance between the traveling vehicle and the target vehicle in units of m by common methods of radio wave or laser radar.

Distance sensing device 140 further includes a filter 146 for filtering out the interference of the signal received from distance sensor 144 to obtain an non-interfered distance signal for a more stabilized distance value between the travelling vehicle and the target vehicle.

Referring to FIG. 1, the fuzzy logic controller 200 further comprises a differentiator 210, an adjusting factor fuzzy logic inference module 220, a safety distance fuzzy logic inference module 230, and a multiplier 240.

If the output of differentiator 210 is positive, this represents the target vehicle is away from the travelling vehicle and also the speed of the travelling vehicle is smaller than the target vehicle. If the output of differentiator 210 is negative, this represents the target vehicle is near the travelling vehicle and also the speed of the travelling vehicle is greater than the target vehicle.

Safety distance fuzzy logic inference module 230 coupled to differentiator 210 and the output of vehicle speed sensing device 130 deduces a safety distance using fuzzy logic. If the output of differentiator 210 is positive, the deduced safety distance will be negative meaning it is safe. Oppositely if the output of differentiator 210 is negative, safety distance fuzzy logic inference module 230 will generate an appropriate deduced safety distance.

Adjusting factor fuzzy logic inference module 220 receives the output from the engine RPM sensing device 110, fuel throttle sensing device 120, and vehicle speed sensing device 130 and deduce the value of the adjusting factor based on the driving habit of the driver, the slope of the road, and the initial condition of the vehicle moving. When the adjusting factor decreases, it means that the safety distance should be loose otherwise when the adjusting factor increases, it means that the safety distance should be tight.

Multiplier 240 receives the adjusting factor from the output of adjusting factor fuzzy logic inference module 220 and the deduced safety distance from the output of safety distance fuzzy logic inference module 230. The adjusting factor and deduced safety distance are multiplied together to obtain a safety distance value.

Safety warning device 300 compares the safety distance value from fuzzy logic inference controller 200 with the relative distance measured by distance sensing device 140. If the relative distance from distance sensing device 140 is greater than the safety distance from fuzzy logic controller 200, safety warning device will display a green light representing safe. If the relative distance is smaller than the safety distance, safety warning device 300 will display a red light representing "danger". If the relative distance is between danger and safe, safety warning device will display a yellow light representing "caution". At this moment, the system will setup a predefined interval. When the relative distance is greater than the interval, it means "safe" and if the relative distance is smaller than this interval, it means "caution".

The core of this invention is the fuzzy logic controller 200, which processes the parameters obtained by sensing module 100. The processing unit is composed of adjusting factor fuzzy logic inference module 220 and safety distance fuzzy logic inference module 230. The safety distance value is directly proportional to the outputs of adjusting factor fuzzy logic inference module 220 and safety distance fuzzy logic inference module 230 because the output of fuzzy logic controller 200 is obtained from the output of the multiplier 240. The output of adjusting factor fuzzy logic inference module 220 is related to the output of engine RPM sensing device 110, fuel throttle sensing device 120, and vehicle speed sensing device 130. The output of safety distance fuzzy logic inference module 230 is related to the output of vehicle speed sensing device 130 and differentiator 210.

The deduced safety distance from safety distance fuzzy logic inference module 230 mentioned above is the result based on the ideal situation of the vehicle running on a flat road. According to the output of vehicle speed sensing device 130 and the different output values of differentiator 210, fuzzy logic controller 200 can calculate a correct safety distance value under different conditions. For example, if distance variation over time remains constant (the output of differentiator determines this value) and vehicle speed increases, the safety distance will also increase.

The adjusting factor deduced by adjusting factor fuzzy logic inference module 220 is based on factors like the driving habits of the driver, the slope of the road, the running condition of the vehicle, and the like. The following will describe in details.

fuel throttle sensing device 120 and vehicle speed sensing device 130 are used together to determine if the road is downwards sloping or if the driver wants to overtake. If the road is downwards sloping, the vehicle speed will increase because of the gravitational force of the weight of the car. Meanwhile the driver will release the fuel throttle of the vehicle to hold on the vehicle speed. At this moment, the output of vehicle speed sensing device 130 will increase and the output of throttle sensing device 120 will not change too much. For this case, the safe distance should be increased and the adjusting factor fuzzy logic inference module 220 will generate an adjusting factor of greater than 1.

When the driver overtakes to pass the vehicle in front, the driver will depress the throttle more to increase the vehicle speed in order to overtake the vehicle in front. The outputs of both throttle sensing device 120 and vehicle speed sensing device 130 will increase causing the safety distance to accordingly increase. As a result, adjusting factor fuzzy logic inference module 220 will generate an adjusting factor of greater than 1.

Furthermore, the output of engine RPM sensing device 110 and vehicle speed sensing device 130 can determine if the vehicle is from standstill to moving. When the vehicle starts moving, due to the inertia of the vehicle, the engine RPM will increase causing the output of engine RPM sensing device 110 to increase significantly but not the vehicle speed, therefore the output of vehicle speed sensing device 130 increases at a slower rate. As a result, the safety distance needs to be accordingly reduced and the adjusting factor fuzzy logic inference module 220 will generate an adjusting factor of smaller than 1.

According to the above, this invention can determine whether the vehicle is travelling on a downwards slope or the driver wants to overtake based on throttle sensing device 120 and vehicle speed sensing device 130 in sensing module 100. The outputs of engine RPM sensing device 110 and vehicle speed sensing device 130 can determine if the vehicle is from standstill to moving. Therefore the system determines if the vehicle is running or starting.

Figure 3:
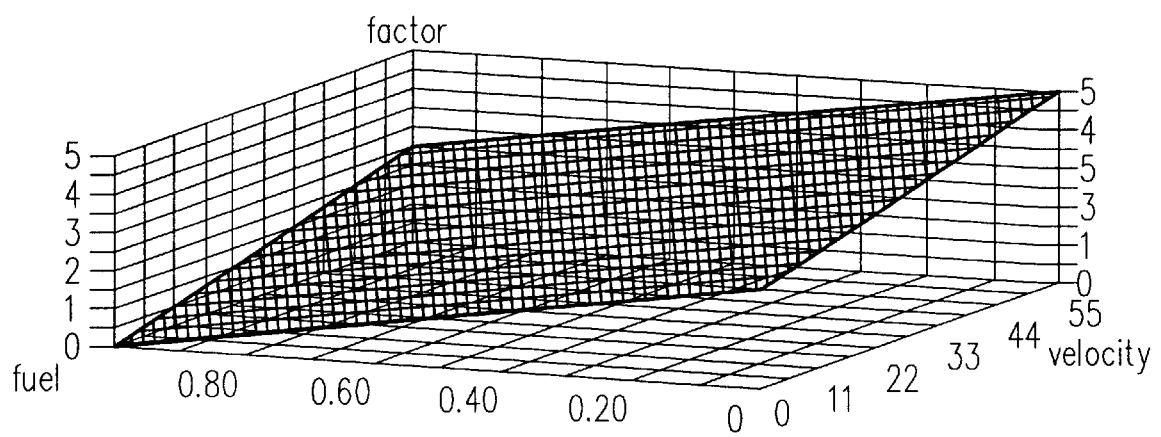
FIG. 3 is a three-dimensional graph showing the fuzzy inference result in the adjusting factor using fuzzy logic inference module.

FIG. 2A to FIG. 2D are graphs showing membership functions of adjusting factor fuzzy logic inference module 220. Wherein RPM represents the engine speed, fuel represents the fuel throttle depress level, velocity represents the vehicle speed, and factor represents the adjusting factor. FIG. 3 is a graph of the result of the adjusting factor using fuzzy logic.

Figure 4A:
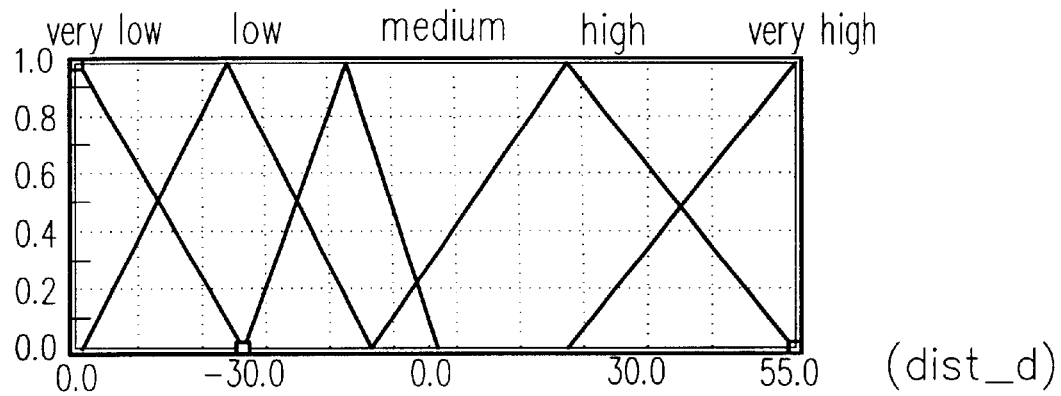
FIG. 4A is a graph showing the input membership function of the relative distance variation in the safety distance fuzzy logic inference module.
Figure 4B:
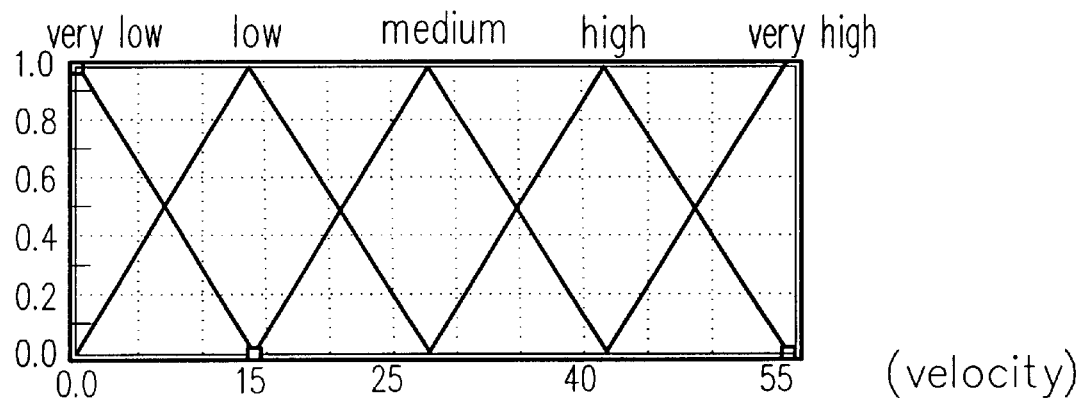
FIG. 4B is a graph showing the input membership function of the vehicle velocity in the safety distance fuzzy logic inference module.
Figure 4C:
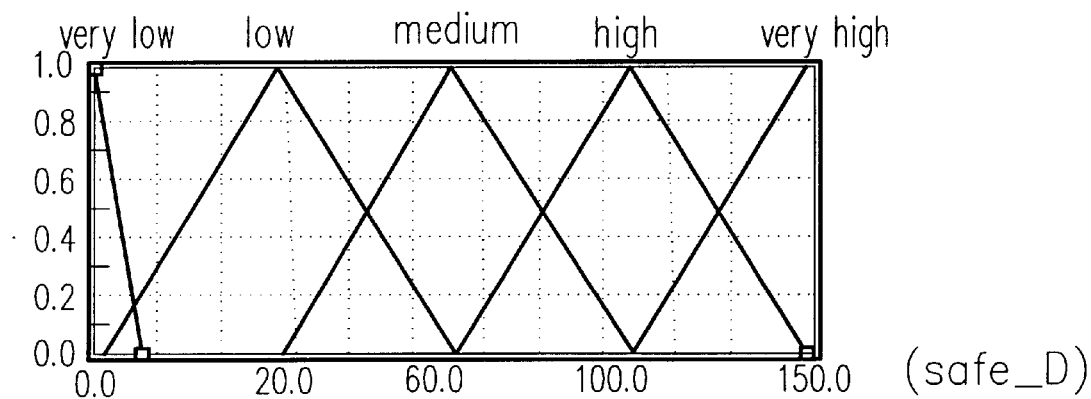
FIG. 4C is a graph showing the output membership function of the deduced safety distance in the safety distance fuzzy logic inference module.
Figure 5:
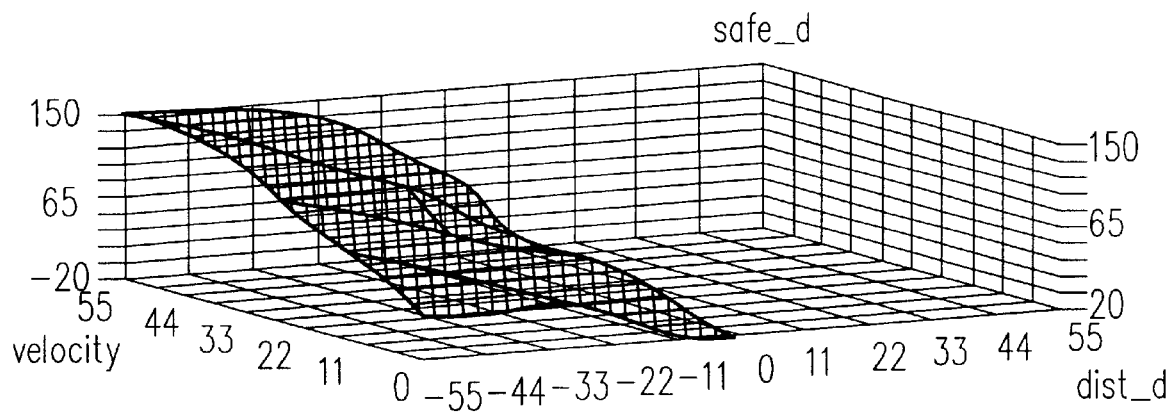
FIG. 5 is a three-dimensional graph showing the fuzzy inference result in the safety distance from fuzzy logic inference module.

FIG. 4A to FIG. 4C are graphs showing membership functions of safety distance fuzzy logic inference module 230. Wherein disd_d represents the change in distance and safe_d represents the safety distance. FIG. 5 is a graph of the result of safe_d of safety distance fuzzy logic inference module 230.

Figure 6:
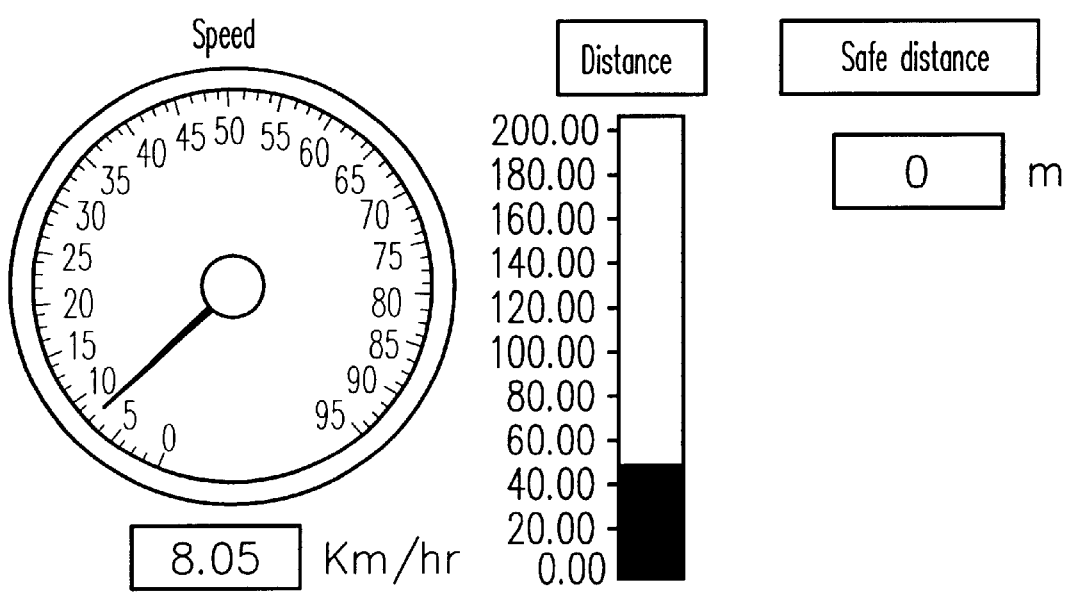
FIG. 6 is a display frame of the simulation of the vehicle collision avoidance warning device of this invention.

The following describes a computer simulation program to demonstrate the practicality of this invention and the preferred embodiment. FIG. 6 is a display frame of the simulation program. It also shows that the vehicle speed, the relative distance from the target vehicle, and the safety distance obtained by the fuzzy logic controller. These simulation tools include, MATLAB™, FuzzyTech™, and Labview™.

In this simulation environment, a simulation of actual road conditions such as upwards sloping or downwards sloping roads or the overtaking action by the driver is performed to obtain the change in vehicle speed and relative distance for displaying a safety distance on display frame. The experiment parameters are entered in real time with the interface by the operator and are not predefined values, therefore the system can accurately reflect the actual condition of the vehicle running on the road.

In the preferred embodiment, two different road conditions are presented. For example: one on a flat road and another on a downward sloping road.

Figure 7:
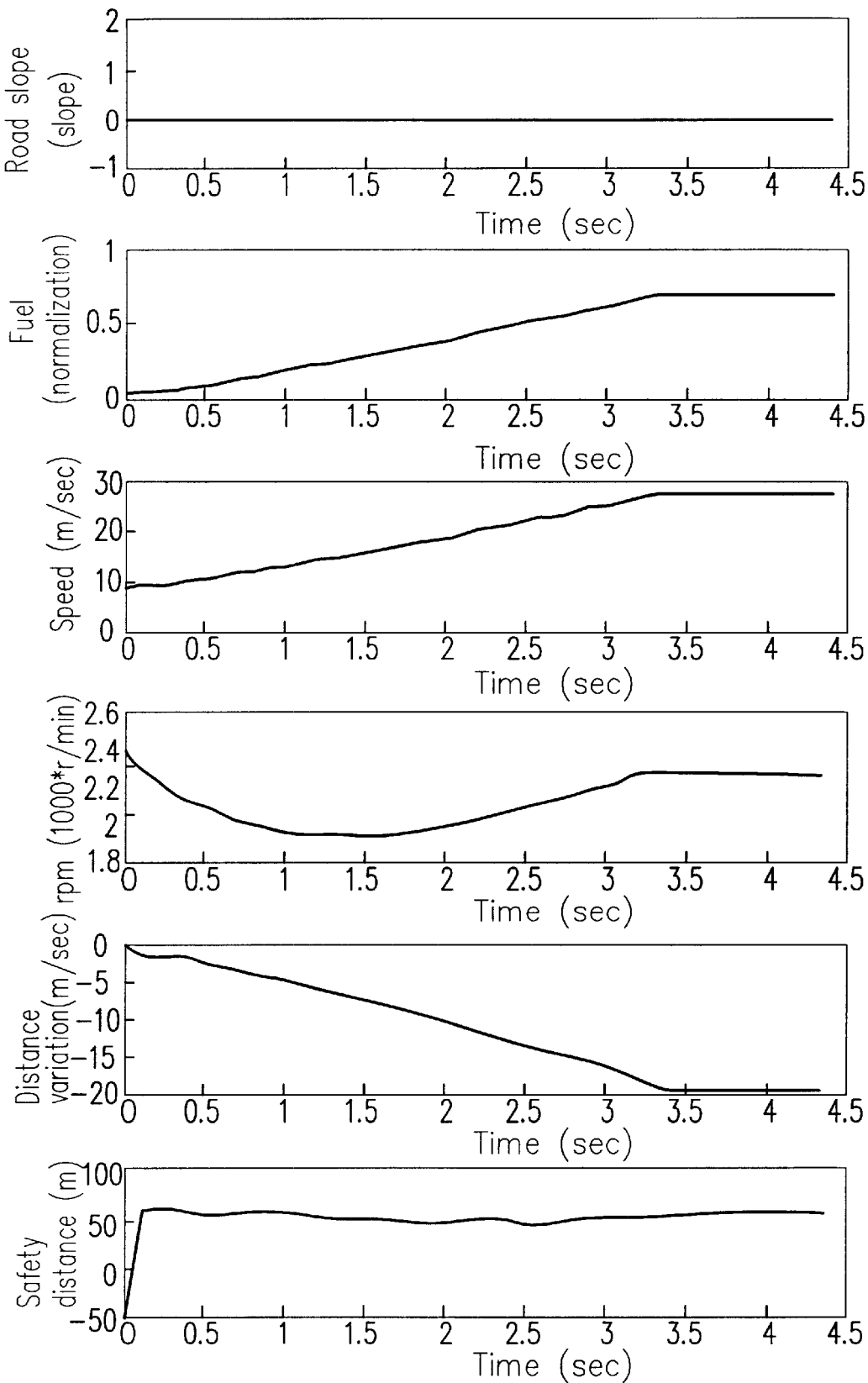
FIG. 7 is a graph of the result of the simulation tested on a flat road.

FIG. 7 is the simulation result tested on a flat road by using the simulation system of FIG. 6. When the vehicle starts moving, the adjusting factor will not change significantly until the vehicle speed reaches a constant value. Finally, the reasonable safe distance will be achieved by the inference of Fuzzy logic.

Figure 8:
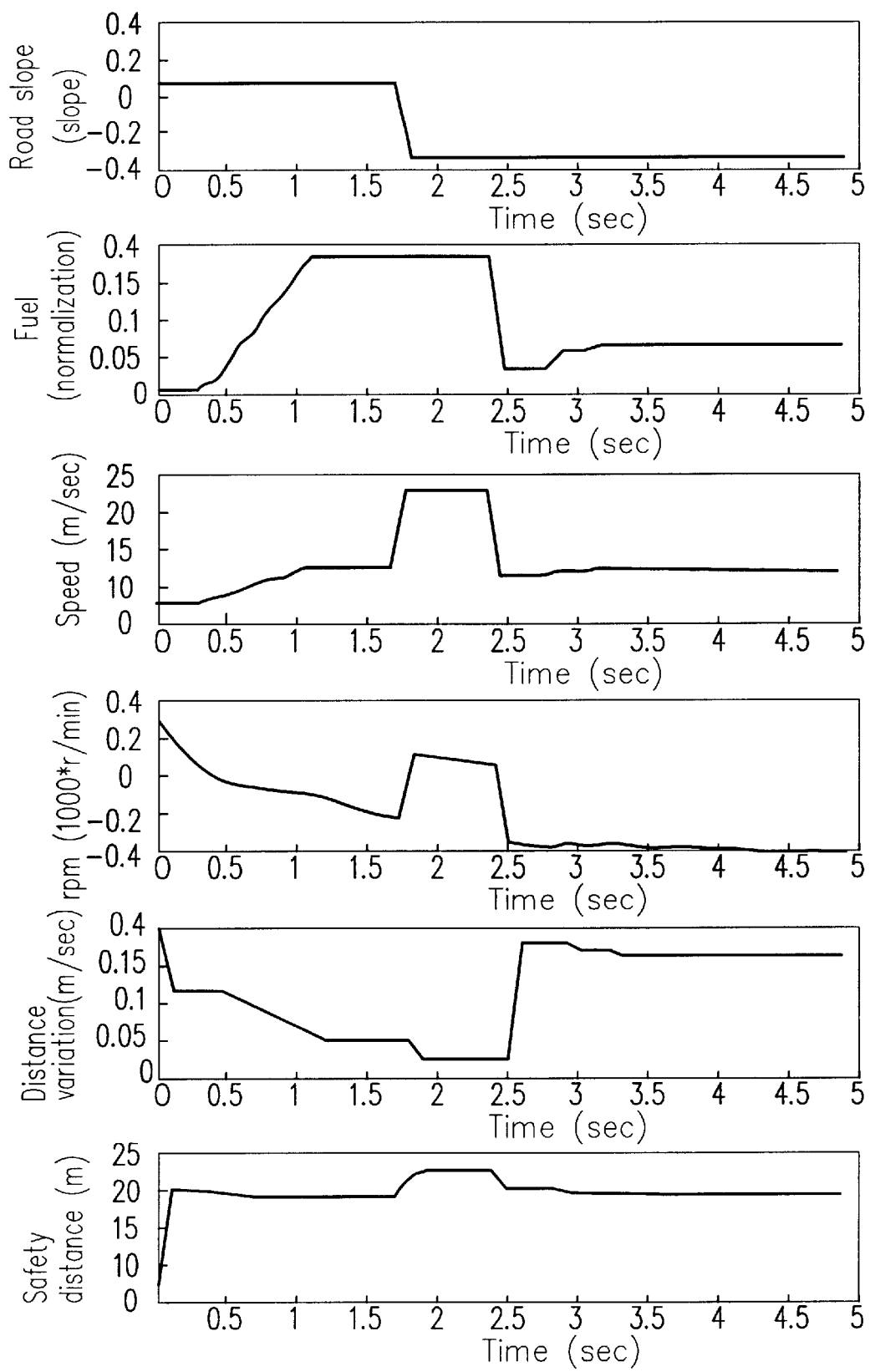
FIG. 8 is a graph of the result of the simulation tested on a downwards sloping road.

FIG. 8 is the result of the simulation program in FIG. 6 tested on a downward sloping road. When the vehicle is starts moving, the adjusting factor is relatively small meaning loose. When the vehicle hits the downward sloping road, the adjusting factor will increase meaning tight and the safety distance will accordingly increase. Until when the fuel throttle decreases, the vehicle speed will return to its original speed and the safety distance will stabilize at a value slightly greater than that on a flat road, which is about 5 meters more assuming that the vehicle speed is stable. For example, at 1.7 second, the road starts to slope downwards so the change of the throttle depress level is relatively small. The vehicle speed begins to increase due to the slope causing the safety distance to increase. Until when the vehicle reaches a flat road, the throttle level changes again causing the safety distance to resume to a value close to its original.

Figure 9:
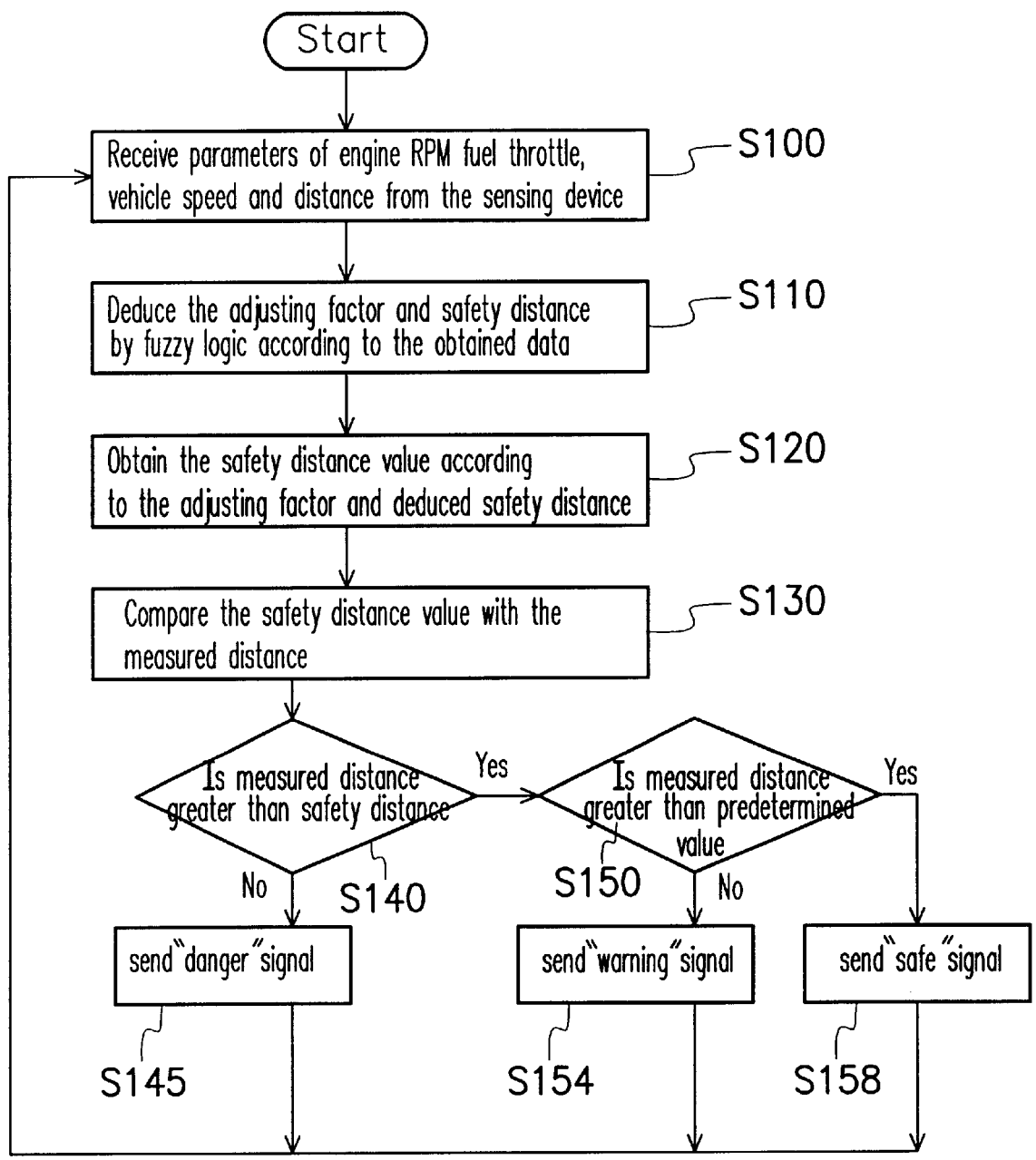
FIG. 9 is flow chart of the vehicle collision avoidance warning method of this invention.

FIG. 9 is a flow chart of the vehicle collision warning method of this invention. Firstly, step S100 receives vehicle parameters of engine RPM, throttle depress level, vehicle speed, and distance. These parameters can be obtained by the different sensing devices in the sensing module in FIG. 1.

Afterwards, step 110 deduces a safety distance using fuzzy logic according to parameters of the engine RPM, throttle, vehicle speed, and distance. The deduced safety distance is obtained using the following formula. Firstly, the parameters of engine RPM, throttle, and vehicle speed are processed using fuzzy logic to deduce an adjusting factor. A safety distance it then deduced using fuzzy logic according to the vehicle speed and distance variation over time. Following, a multiplication of the adjusting factor and the safety distance is performed to obtain a safety distance value (step S120).

Step S130 compares the safety distance value with the relative distance and displays a warning signal according to the comparison result. At this time, when the relative distance is smaller than the safety distance, warning signal is a danger signal (step S145). Oppositely when the relative distance is greater than the safety distance, determination of whether the relative distance is greater than the predefined value is performed (step S150). In step S158, when the relative distance is greater than the predefined value, warning signal is a safe signal. In step S154, when the relative distance is smaller than the predefined value, warning signal is a caution signal.

The above description of a combination of a vehicle sensing device and a fuzzy logic controller allows great flexibility and has the following advantages:

According to the vehicle collision avoidance warning device of this invention, the number of sensing devices are reduced to save cost but can improve performance. The membership functions of the fuzzy logic controller in this invention does not require precise measurements of vehicle speed and relative distance and can further reduce the cost by using these sensing devices.

According to the vehicle collision avoidance warning device of this invention, even though every driver has a different driving pattern, the difference in the operation in vehicle speed and throttle release is not too big. These minor changes can be absorbed by the fuzzy logic controller to overcome.

According to the vehicle collision avoidance warning device of this invention, the adjusting factor is deduced by processing the parameters of engine RPM and fuel throttle depress using fuzzy logic. When the vehicle starts moving, the system will be in a loose mode, in which the safety distance is automatically reduced, to avoid unnecessary interference. Furthermore, under more dangerous road conditions such as downward sloping road, the system will enter a tight mode and increase safety distance. Therefore the system can warn the driver in advance to prevent danger.

According to the vehicle collision avoidance warning device of this invention, when the driver suddenly increases speed such as for overtaking, the warning device will enter a tight mode and increase safety distance because of higher exposure to danger. Therefore the warning device can warn the driver in advance to prevent danger. Until when the fuel throttle is released and the vehicle speed decreases, the system will decrease its safety distance to its original value.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A vehicle collision avoidance warning device, comprising:
    a sensing module for detecting an engine RPM, a fuel throttle index, a vehicle speed, a relative distance;
    a fuzzy logic controller coupled to the sensing module for receiving and according to the engine RPM, the fuel throttle index, the vehicle speed, and the relative distance to deduce a safety distance using fuzzy logic; and
    a safety warning device coupled to the fuzzy logic controller and the sensing module for comparing the distance and the safety distance and generate a warning signal according to a comparison result.

2. The warning device in claim 1, wherein the sensing module, further comprising:
    an engine RPM sensing device for detecting the engine RPM of a vehicle;
    a fuel throttle sensing device for detecting a throttle depress level and output the throttle index;
    a vehicle speed sensing device for detecting the vehicle speed; and
    a distance sensing device for measuring the relative distance.

3. The warning device in claim 2, wherein the distance sensing device further comprises a filter coupled to the distance sensing device for filtering out interference of signal of the distance.

4. The warning device in claim 1, wherein the fuzzy logic controller, further comprising:
    a differentiator for receiving a signal of the distance and differentiate to obtain a distance variation over time;
    an adjusting factor fuzzy logic inference module for receiving the engine RPM, the throttle index, and the vehicle speed and deducing an adjusting factor using fuzzy logic;
    a safety distance fuzzy logic inference module coupled to the differentiator for receiving the vehicle speed and an output of the differentiator and generating a deduced safety distance using fuzzy logic; and
    a multiplier coupled to the adjusting factor fuzzy logic inference module and the safety distance fuzzy logic inference module for multiplying the adjusting factor by the deduced safety distance to generate a safety distance value.

5. The method in claim 4, wherein the adjusting factor fuzzy logic inference module further comprises: obtaining an adjusting factor using fuzzy logic according to the engine RPM, the fuel throttle, and the vehicle speed; and wherein the safety distance fuzzy logic inference module comprising obtaining a deduced safety distance using fuzzy logic according to the vehicle speed and a variation of the distance over time.

6. The warning device in claim 4, wherein the safety warning device further comprises:

outputting the safety warning signal as a danger signal when the distance is less than the safety distance value;

determining if the distance is greater than a predefined value when the distance is greater than the safety distance value;

outputting the safety warning signal as a safe signal when the distance is greater than the predefined value; and outputting the safety warning signal as a caution signal when the distance is smaller than the predefined value.

\* \* \* \* \*